(12) United States Patent
Olsson et al.

(10) Patent No.: US 11,993,328 B2
(45) Date of Patent: May 28, 2024

(54) LIFTING ARRANGEMENT FOR LIFTING A WHEEL AXLE OF A VEHICLE

(71) Applicant: Volvo Truck Corporation, Gothenburg (SE)

(72) Inventors: Anders Olsson, Torslanda (SE); Yogesh Ramachandra, Karnataka (IN); Simon Wassenius, Gothenburg (SE); Calixthe Mattei, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/095,151

(22) Filed: Jan. 10, 2023

(65) Prior Publication Data

US 2023/0227117 A1 Jul. 20, 2023

(30) Foreign Application Priority Data

Jan. 17, 2022 (WO) ................. PCT/EP2022/050902
Jun. 7, 2022 (SE) .................................... 2250687-7

(51) Int. Cl.
*B62D 61/12* (2006.01)
*B60G 13/00* (2006.01)
*B60G 17/016* (2006.01)

(52) U.S. Cl.
CPC ............ *B62D 61/125* (2013.01); *B60G 13/00* (2013.01); *B60G 17/016* (2013.01); *B60G 2300/02* (2013.01)

(58) Field of Classification Search
CPC .............. B60G 17/016; B60G 2204/47; B60G 2500/30; B62D 61/125; F16F 9/56; F16F 9/58

See application file for complete search history.

(56) References Cited

U.S. PATENT DOCUMENTS 2,917,321 A 12/1959 Fennell
3,784,218 A 1/1974 Stone
(Continued)

FOREIGN PATENT DOCUMENTS

CN 107757286 A * 3/2018 ............. B60G 15/02
EP 1582383 A1 * 10/2005 ............. B60G 13/14
(Continued)

OTHER PUBLICATIONS

Extended European Search Report for European Patent Application No. 23151044.7, dated Mar. 13, 2023, 11 pages.
(Continued)

*Primary Examiner* — Paul N Dickson
*Assistant Examiner* — Matthew D Lee
(74) *Attorney, Agent, or Firm* — Withrow & Terranova, PLLC (57) ABSTRACT

A lifting arrangement for lifting a wheel axle of a vehicle comprising a first elongated member extending along a first axis comprising a vehicle frame coupling portion for connecting the lifting arrangement to a vehicle frame of the vehicle during use, a second elongated member extending along a second axis comprising a wheel axle coupling portion for connecting the lifting arrangement to the wheel axle of the vehicle during use, wherein the vehicle frame coupling portion and the wheel axle coupling portion are offset from each other by a length and wherein the lifting arrangement is arranged to adjust the length between a maximum length and a minimum length by axially moving the second elongated member along the second axis relative the first elongated member, wherein the lifting arrangement further comprises an engaging device for axially moving the second elongated member along the second axis relative the first elongated member.

19 Claims, 6 Drawing Sheets

(56) References Cited

U.S. PATENT DOCUMENTS

| | | | | |
|---|---|---|---|---|
| 5,044,614 A | * | 9/1991 | Rau | B60G 17/021 |
| | | | | 267/221 |
| 5,700,026 A | | 12/1997 | Zalewski et al. | |
| 6,827,184 B1 | * | 12/2004 | Lin | B60G 11/15 |
| | | | | 267/221 |
| 9,068,616 B1 | * | 6/2015 | Serbu | B60G 17/0272 |
| 2016/0084333 A1 | * | 3/2016 | Adoline | F16F 1/121 |
| | | | | 267/140.2 |
| 2017/0151851 A1 | * | 6/2017 | Alpers | B60G 17/021 |
| 2018/0297433 A1 | * | 10/2018 | Ohno | B60G 17/0157 |
| 2019/0030974 A1 | * | 1/2019 | Yang | F16F 9/3207 |
| 2021/0291610 A1 | * | 9/2021 | Goto | B60G 17/06 |

FOREIGN PATENT DOCUMENTS

| | | | | |
|---|---|---|---|---|
| EP | 1582383 A1 | | 10/2005 | |
| FR | 2927036 A1 | | 8/2009 | |
| FR | 3020992 A1 | * | 11/2015 | B60G 17/02 |
| FR | 3020992 A1 | | 11/2015 | |
| GB | 2404171 A | | 1/2005 | |
| WO | 02087908 A1 | | 11/2002 | |
| WO | 03080372 A1 | | 10/2003 | |

OTHER PUBLICATIONS

Office Action for Swedish Application No. 22506877, dated Jan. 11, 2023, 7 pages.

International Search Report and Written Opinion for International Patent Application No. PCT/EP2022/050902, dated Jul. 4, 2022, 12 pages.

* cited by examiner

LIFTING ARRANGEMENT FOR LIFTING A WHEEL AXLE OF A VEHICLE

RELATED APPLICATIONS

The present application claims priority to Swedish Patent Application No. 2250687-7, filed on Jun. 7, 2022, and entitled "LIFTING ARRANGEMENT FOR LIFTING A WHEEL AXLE OF A VEHICLE," and is a continuation of International Patent Application No. PCT/EP2022/050902, filed on Jan. 17, 2022, and entitled "LIFTING ARRANGEMENT FOR LIFTING A WHEEL AXLE OF A VEHICLE," the disclosures of which are incorporated herein by reference in their entireties.

TECHNICAL FIELD

The disclosure relates to a lifting arrangement for lifting a wheel axle of a vehicle. The disclosure also relates to a shock absorber device, a vehicle suspension system and to a vehicle.

The invention can be applied in heavy-duty vehicles, such as trucks, buses and construction equipment. Although the invention will be described with respect to a truck, the invention is not restricted to this particular vehicle, but may also be used in other vehicles.

BACKGROUND

In suspensions for heavy-duty trucks, there is generally a need to lift one or several of the truck's wheel axles, either when the load of the truck is low to save fuel and tyre wear or to increase ground pressure for increased traction of the wheel axles remaining on the ground. However, traditional solutions are usually large and/or heavy.

SUMMARY

An object of the disclosure is to provide an improved lifting arrangement for a vehicle which alleviates at least one of the drawbacks of the prior art, or which at least provides a suitable alternative. Other objects of the disclosure are to provide a shock absorber device, a vehicle suspension system and a vehicle which alleviates at least one of the drawbacks of the prior art, or which at least provides a suitable alternative.

According to a first aspect, the object is achieved by a lifting arrangement.

Hence, there is provided a lifting arrangement for lifting a wheel axle of a vehicle, the lifting arrangement comprising:
  a first elongated member extending along a first axis, the first elongated member comprising a vehicle frame coupling portion for connecting the lifting arrangement to a vehicle frame of the vehicle during use,
  a second elongated member extending along a second axis, the second elongated member comprising a wheel axle coupling portion for connecting the lifting arrangement to the wheel axle of the vehicle during use,
  wherein the vehicle frame coupling portion and the wheel axle coupling portion are offset from each other by a length and wherein the lifting arrangement is arranged to adjust the length between a maximum length and a minimum length by axially moving the second elongated member along the second axis relative the first elongated member,
  wherein the lifting arrangement further comprises an engaging device for axially moving the second elongated member along the second axis relative the first elongated member, and wherein the engaging device is arranged to be provided in an engaged state with the first elongated member or the second elongated member so that the length can be reduced and in a disengaged state with respect to the first elongated member or the second elongated member so that forces exerted on the wheel axle coupling portion from the wheel axle during use are prevented from being transferred to the engaging device.

By the provision of a lifting arrangement as disclosed herein, an improved lifting arrangement for lifting a wheel axle is achieved. For example, the present invention is based on a realization that it is advantageous to provide the engaging device in a disengaged state as disclosed herein. Thereby, the risk of damaging sensitive mechanical elements which operate/drive the engaging device can be reduced. In particular, movements of the wheel axle caused by the vehicle driving over bumps, irregularities, pot-holes, etc., are allowed without damaging any of the mechanical elements which are used for operating/driving the engaging device. In addition, by the provision of the lifting arrangement as disclosed herein, a robust, reliable and cost-effective arrangement for lifting a wheel axle is achieved.

The lifting arrangement may be used for releasing wheels of the wheel axle from ground and/or for unloading the wheel axle.

For example, the engaging device may be arranged to be provided in the disengaged state with respect to the second elongated member so that axial forces exerted on the wheel axle coupling portion from the wheel axle during use are prevented from being transferred to the engaging device. By axial forces is meant forces which are directed in the axial direction along the second axis and/or the first axis.

For example, the lifting arrangement may be part of a vehicle suspension system, such as an air suspension system and/or a coil spring suspension system.

Optionally, the first and second elongated members may be arranged so that the first axis and the second axis are aligned during movement between the maximum length and the minimum length or so that the first axis and the second axis are parallel during movement between the maximum length and the minimum length. This implies a robust and cost-effective configuration.

Optionally, the first and second elongated members may be telescopically arranged relative each other. This implies a robust, compact and cost-effective configuration.

Optionally, the first and second elongated members may form a shock absorber device for the vehicle. This implies a robust, compact and cost-effective configuration. In particular, by integrating the lifting arrangement with a shock absorber, a more compact configuration is achieved.

Optionally, the engaging device may be axially movable along the second axis relative the second elongated member. Still optionally, the engaging device may be axially movable in any direction along the second axis relative the second elongated member.

Optionally, the first or the second elongated member may comprise a stop surface for the engaging device, and, in the engaged state, the engaging device is arranged to engage with the stop surface and thereafter axially move the second elongated member along the second axis relative the first elongated member so that the length is reduced. Thereby, the wheel axle can be lifted during use of the lifting arrangement.

Optionally, in the engaged state and at least until the minimum length is reached, the first or the second elongated member may be releasable from the engaging device so that the length can be reduced. Thereby, during lifting of the wheel axle during use, the wheel axle is allowed to be moved upwardly towards the vehicle frame, i.e. upwardly as seen with respect to a height direction of the vehicle. As a consequence, any upward movements of the wheel axle caused by the vehicle driving over bumps, irregularities etc. are still allowed during lifting of the wheel axle. This implies reduced risk of damaging any mechanical elements during the lifting procedure.

Optionally, the engaging device may be a nut member enclosing the second elongated member, or the engaging device may be at least one pin member movable in a track of the first elongated member. These configurations have shown to be robust and cost-effective.

Optionally, the lifting arrangement may further comprise a motor, such as an electric motor, wherein the engaging device is driven by the motor for axially moving the second elongated member along the second axis relative the first elongated member.

Still optionally, the lifting arrangement may further comprise one or more mechanical driving elements, such as a gearbox and a screwing rod, for transferring a driving force from the motor to the engaging device. By the provision of the present invention, the risk of damaging these mechanical driving elements is significantly reduced.

Optionally, in the engaged state, the engaging device may mechanically axially couple the first elongated member and the second elongated member together.

Optionally, the engaging device may comprise a first element and a second element, the first elongated member comprising the first element and the second elongated member comprising the second element, the first element and the second element being reversibly engageable with each other. The engaging device may in some embodiments be denoted an engaging system as disclosed herein. The engaging device may additionally or alternatively in some embodiments be denoted a first element as disclosed herein.

Optionally, one element among the first element and the second element of the engaging device may comprise a driving device and the other element among the first element and the second element of the engaging device may comprise a driven device, the driving device and the driven device being configured to cooperate by form-fitting.

Optionally, the driven device may comprise a rack or a helical path, such as a filet, a threading, a tapping of any shape, or the like.

Optionally, the engaging device may be configured to reversibly engage the driving device and the driven device.

Optionally, the first elongated member may comprise a piston rod.

Optionally, the first element of the engaging device may at least in part be mounted onto a dust cover of the piston rod.

Optionally, the dust cover may be rotatable relative to the second part around the second axis.

Optionally, the driving device may be mounted onto the dust cover and the motor may be configured to rotate the dust cover around the second axis.

Optionally, the second elongated member may comprise a stator.

Optionally, the rack or the helical path may be arranged on an outer face of the stator.

According to a second aspect, the object is achieved by a shock absorber device for a vehicle comprising a shock absorber extending along an axis and a lifting device, the shock absorber comprising a first part and a second part axially movable with regard to each other along the axis and having a first length along the axis in a rest position, the lifting device being mounted onto the shock absorber and being configured to adjust a length of the shock absorber along the axis between a second length and the first length, the second length being less than the first length, wherein the lifting device has a released configuration in which the lifting device allows the first part and the second part to axially move with regard to each other along the axis and an engaged configuration in which the lifting device axially couples the first part and the second part together.

Due to this configuration, the lifting device and the shock absorber may be integrated together in a simple way. This may render such a shock absorber device simple, space saving and/or may help to reduce the weight relative to the devices of the prior art.

It shall be noted that all embodiments of the first aspect of the disclosure are combinable with all embodiments of the second aspect of the disclosure, and vice versa. According to some examples, the shock absorber device may be denoted a lifting arrangement as disclosed herein. The engaged configuration as disclosed herein may also be denoted an engaged state and the released configuration as disclosed herein may also be denoted a disengaged state. In a similar vein, the engaged state as disclosed herein may also be denoted an engaged configuration and the released configuration as disclosed herein may also be denoted a disengaged state. The first part of the shock absorber device may in some embodiments be denoted a first elongated member as disclosed herein, or vice versa. The second part of the shock absorber device may in some embodiments be denoted a second elongated member as disclosed herein, or vice versa.

For example, the first length may be the length of the shock absorber when mounted onto a vehicle, the vehicle being empty (i.e. unloaded). In another example, the first length may be the maximum length of the shock absorber when not mounted onto a vehicle. The second length may be the minimal length of the shock absorber when totally compressed (i.e. maximum stroke).

For example, the second length may be strictly less than the first length. For example, the difference between the first length and the second length, or between the maximum length and the minimum length, may lie in a range of 5 cm to 20 cm.

In the released configuration, the shock absorber is axially free (i.e. is not axially constrained/blocked) relative to the lifting device and may damp any potential shocks, as usual. In the engaged configuration, the lifting device may cooperate with the shock absorber in order to axially couple the first and second parts of the shock absorber and to compress the shock absorber, i.e., reduce the axial length of the shock absorber, and an axle may be lifted. The other degrees of freedom than the axial movements may be blocked or not.

Optionally, in the engaged configuration, the lifting device may mechanically axially couple the first part and the second part together.

Still optionally, the lifting device may comprise an engaging system configured to reversibly axially couple the first part and the second part.

The engaging system may be configured to operate a movable portion in order to couple/uncouple the first part and the second part.

For example, the engaging system may comprise a mechanical control device, e.g., comprising a cam and a rod or the like; an electrical control device, e.g., comprising a solenoid, an electromagnet, or the like, etc.

Optionally, the lifting device may comprise a first element and a second element, the first part of the shock absorber being provided with the first element and the second part of the shock absorber being provided with the second element, the first element and the second element being reversibly engageable with each other.

The first/second element may be mounted or formed onto the first/second part, respectively. According to a further embodiment, one element among the first element and the second element may comprise a driving device and the other element among the first element and the second element may comprise a driven device, the driving device and the driven device being configured to cooperate by form-fitting.

For example, the driving device may comprise a pinion, a tapping, a ball, a needle etc. For example, the driven device may comprise a rack, a helical path (i.e. filet, threading, tapping of any shape or the like), etc. For example, the engaging system may be configured to engage/disengage the driving device and the driven device.

Optionally, the lifting device may comprise a motor, for example an electric motor, an air driven motor or a hydraulically driven motor, configured to drive the driving device.

The motor may be configured to be mounted onto the vehicle or onto a portion of the shock absorber device. Such a motor may be electrically/air/hydraulically powered by any source already provided in the vehicle.

Still optionally, the driven device may comprise a rack or a helical path.

The helical path may be a filet, a threading, a tapping of any shape or the like.

Still optionally, the engaging system may be configured to reversibly engage the driving device and the driven device.

Optionally, the first part may comprise a piston rod.

Optionally, the first element may be at least in part mounted onto a dust cover of the piston rod.

Optionally, the dust cover may be rotatable relative to the second part around the axis.

The dust cover may be configured to also rotate relative to the piston rod, but not necessarily.

Optionally, the driving device may be mounted onto the dust cover and the motor may be configured to rotate the dust cover around the axis.

Optionally, the second part may comprise a stator. A stator is also known by the skilled person as "shock absorber outer tube".

Optionally, the rack or the helical path may be arranged on an outer face of the stator.

An embodiment relates to a vehicle comprising the shock absorber device according to any one of the embodiments of the present disclosure.

All or part of the above features, considered alone or in combination, may contribute to the provision of a simple, compact and/or light structure.

The object is also achieved by a vehicle suspension system comprising a lifting arrangement and/or a shock absorber device as disclosed herein. The object is also achieved by a vehicle.

Further advantages and advantageous features of the disclosure are disclosed in the following description and in the dependent claims.

BRIEF DESCRIPTION OF THE DRAWINGS

With reference to the appended drawings, below follows a more detailed description of embodiments of the disclosure cited as examples.

In the drawings.

The drawings are schematic and not necessarily drawn to scale. It shall be understood that the embodiments shown and described are exemplifying and that the disclosure is not limited to these embodiments. It shall also be noted that some details in the drawings may be exaggerated in order to better describe and illustrate the disclosure. Like reference characters throughout the drawings refer to the same, or similar, type of element unless expressed otherwise.

DETAILED DESCRIPTION OF EXAMPLE EMBODIMENTS OF THE INVENTION

Figure 1:
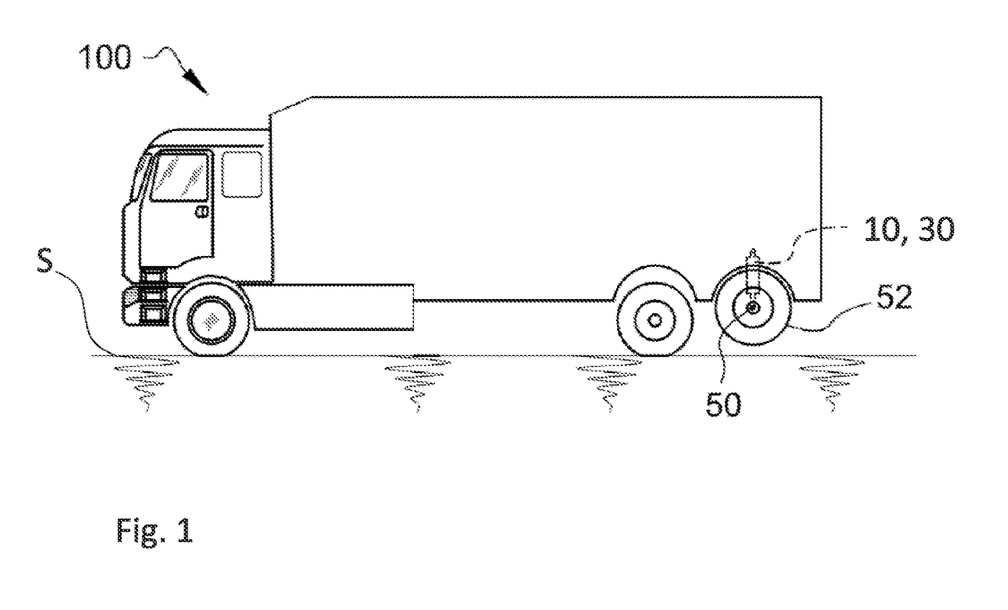
FIG. 1 is a side view of a vehicle according to example embodiments of the present disclosure.

FIG. 1 depicts a vehicle 100 according to an example embodiment of the present disclosure. In the present example the vehicle 100 is a truck, provided with wheels 52, in this example rear wheels, mounted on a wheel axle 50. The wheel axle 50 may be mounted onto a chassis, or vehicle frame, of the vehicle 100. A lifting arrangement 30 and/or a shock absorber device 10 according to example embodiments of the present disclosure is/are provided between the wheel axle 50 and the vehicle frame for lifting the wheel axle 50 from a ground surface S. For example, the vehicle 100 may comprise as many shock absorber devices 10 as traditional dampers or the like usually used to mount the axle 50 on the chassis of the vehicle 100, in replacement of said traditional dampers or the like, or a mix of shock absorber device(s) 10 and of traditional dampers or the like. As yet another example, the vehicle 100 may comprise one or more lifting arrangements 30 together with one or more traditional dampers, together forming a vehicle suspension system.

Figure 2A:
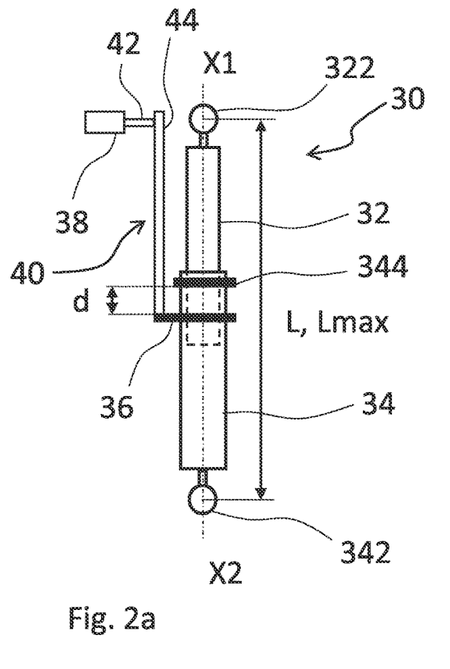
FIGS. 2a and 2b are schematic views of a lifting arrangement according to an example embodiment of the present disclosure.
Figure 2B:
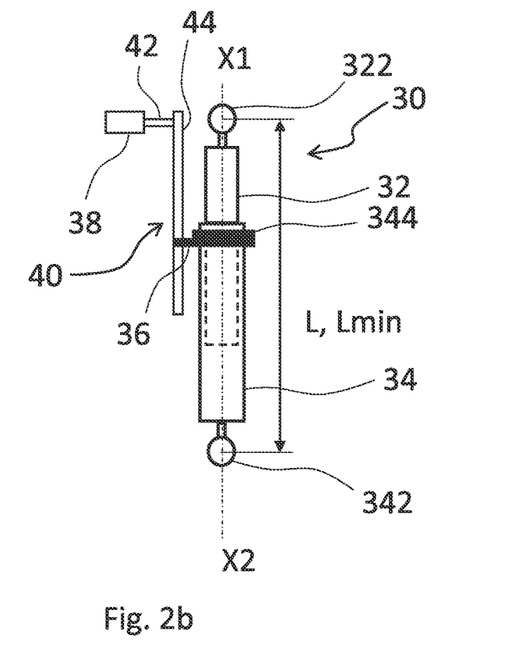

For example, the lifting arrangement 30 may be a lifting arrangement as depicted in FIGS. 2a and 2b.

The lifting arrangement 30 as shown in FIGS. 2a and 2b comprises:
 a first elongated member 32 extending along a first axis X1, the first elongated member 32 comprising a vehicle frame coupling portion 322 for connecting the lifting arrangement 30 to the vehicle frame of the vehicle 100 during use.

The lifting arrangement 30 further comprises:
 a second elongated member 34 extending along a second axis X2, the second elongated member 34 comprising a wheel axle coupling portion 342 for connecting the lifting arrangement 30 to the wheel axle 50 of the vehicle 100 during use.

The vehicle frame coupling portion 322 and the wheel axle coupling portion 342 are offset from each other by a length L and the lifting arrangement 30 is arranged to adjust the length L between a maximum length Lmax, see FIG. 2a, and a minimum length Lmin, see FIG. 2b, by axially moving the second elongated member 34 along the second axis X2 relative the first elongated member 32. The maximum length Lmax may be a maximum length as seen when the vehicle 100 is provided on a flat surface. Alternatively, the maximum length Lmax may be a maximum length as seen when the vehicle 100 is lifted up so that its wheels are not in contact with a ground surface.

The lifting arrangement 30 further comprises an engaging device 36 for axially moving the second elongated member 34 along the second axis X2 relative the first elongated member 32. The engaging device 36 is arranged to be provided in an engaged state with the second elongated member 34 so that the length L can be reduced and in a disengaged state with respect to the second elongated member 34 so that forces exerted on the wheel axle coupling portion 342 from the wheel axle 50 during use are prevented from being transferred to the engaging device 36. An example of the disengaged state is shown in FIG. 2*a*, in which a gap, or distance, d is provided between a stop surface 344 of the second elongated member 34 and the engaging device 36, as seen in the axial direction along the axis X2. By said distance d, forces exerted on the wheel axle coupling portion 342 are prevented from being transferred to the engaging device 36.

It shall be understood that this functionality may also be realized in other ways. For example, the engaging device 36 may be disengaged from the second elongated member 34 by moving away from the second elongated member 36 in a radially outward direction with respect to the axis X2. For example, the engaging device 36 may be formed as a split nut member (not shown) which is disengaged from the second elongated member 34 by moving each split part of the nut member radially away from the second elongated member 34. In said example, the engaging device 36 and the second elongated member 34 may be connected via a helical groove, wherein the members 32, 34 are rotated relative each other for adjusting the length L. For example, a part of the member 32 may be rotated relative the member 34. Examples of such a configuration will for example be explained in the below with respect to FIGS. 5-7*b*.

FIG. 2*b* shows an example of the engaged state when the engaging device 36 and the stop surface 344 are in contact, i.e. in engagement. In the shown example, the length L is a minimum length Lmin, i.e. in this state, during use, the lifting arrangement 30 has lifted the wheel axle 50 as far away as possible from the ground surface S.

Figure 3A:
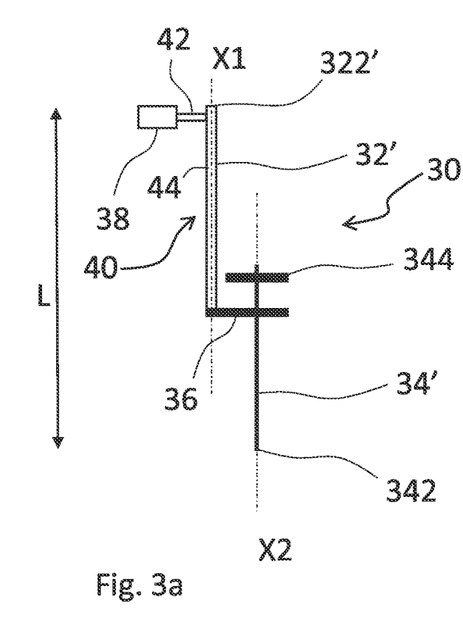
FIGS. 3a and 3b are schematic views of respective lifting arrangements according to example embodiments of the present disclosure.
Figure 3B:
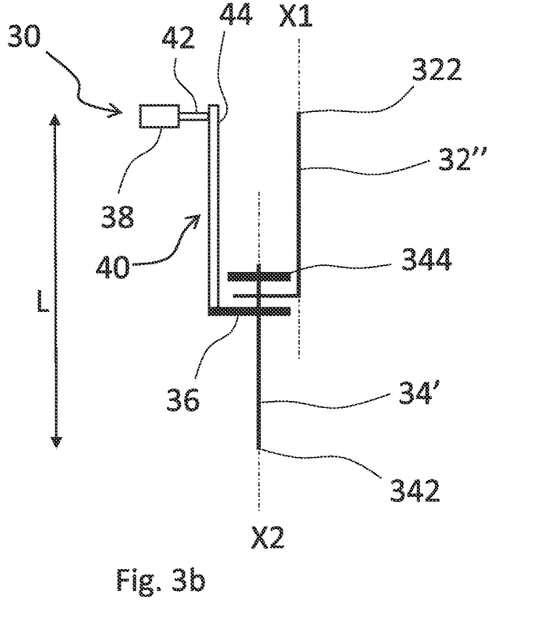

As shown in FIGS. 2*a* and 2*b*, the first and second elongated members 32, 34 may be arranged so that the first axis X1 and the second axis X2 are aligned during movement between the maximum length Lmax and the minimum length Lmin. For example, the lifting arrangement 30 may be configured so that the first axis X1 and the second axis X2 are always aligned with respect to each other. Alternatively, as depicted in FIGS. 3*a* and 3*b*, the first 32', 32" and the second 34' elongated members may be arranged so that the first axis X1 and the second axis X2 are parallel during movement between the maximum length Lmax and the minimum length Lmin. For example, the lifting arrangement 30 may be configured so that the first axis X1 and the second axis X2 are always parallel with respect to each other.

As further shown in FIGS. 2*a* and 2*b*, the first and second elongated members 32, 34 may be telescopically arranged relative each other. In other words, one of the members 32, 34 may be configured to be axially movable relative the other member 34, 32 inside the other member 34, 32. In the shown embodiment, the first elongated member 32 is arranged to be axially movable relative the second elongated member 34 inside the second elongated member 34. For example, at least one of the members 32, 34 may as shown be of tubular shape.

By way of example, the first and second elongated members 32, 34 may form a shock absorber device for the vehicle 100.

Still further, additionally or alternatively, the lifting arrangement 30 may be biased towards the maximum length Lmax.

For example, as may be gleaned from FIGS. 2*a*-3*b*, the engaging device 36 is axially movable along the second axis X2 relative the second elongated member 34, 34'.

The second elongated member 34, 34' may as shown comprise a stop surface 344 for the engaging device 36, i.e. the stop surface 344 as already mentioned in the above. In the engaged state, the engaging device 36 is arranged to engage with the stop surface 344 and thereafter axially move the second elongated member 34 along the second axis X2 relative the first elongated member 32 so that the length L is reduced. In the engaged state and at least until the minimum length Lmin is reached, the second elongated member 34 is releasable from the engaging device 36 so that the length L can be reduced. For example, when the distance d has been reduced to zero, the second elongated member 34 is still allowed to move towards the vehicle frame coupling portion 322 along the axis X2 and away from the engaging device 36. Thereby, during the lifting procedure, the second elongated member 34 can still be moved upwardly without damaging the engaging device 36 and any mechanical elements for operating/driving the engaging device 36, i.e. mechanical elements for axially moving the engaging device 36 along the axis X2.

As further depicted in FIGS. 2*a*-3*b*, the lifting arrangement 30 may further comprise a motor 38, such as an electric motor. The engaging device 36 is driven by the motor 38 for axially moving the second elongated member 34 along the second axis X2 relative the first elongated member 32. It shall be noted that in alternative embodiments, the motor may be an air-driven motor, a hydraulic motor, or any other type of motor.

As further depicted in FIGS. 2*a*-3*b*, the lifting arrangement 30 may further comprise one or more mechanical driving elements 40, such as a gearbox 42 and a screwing rod 44, for transferring a driving force from the motor 38 to the engaging device 36. Accordingly, the engaging device 36 may be arranged to be axially moved along the screwing rod 44, e.g. by a helical connection between the screwing rod 44 and the engaging device 36. More specifically, a rotation of the screwing rod 44 caused by the motor 38 via the gearbox 42 may result in that the engaging device 36 is moved along the axis X2. The connection between the screwing rod 44 and the engaging device 36 may be a ball-screw connection.

In the embodiment depicted in FIG. 3*a*, the screwing rod 44 forms the first elongated member 32' of the lifting arrangement 30.

As indicated in the above, the first and second elongated members 32, 32', 32", 34, 34' may be configured differently, such as formed as tube formed members or as screwing rods.

Figure 4A:
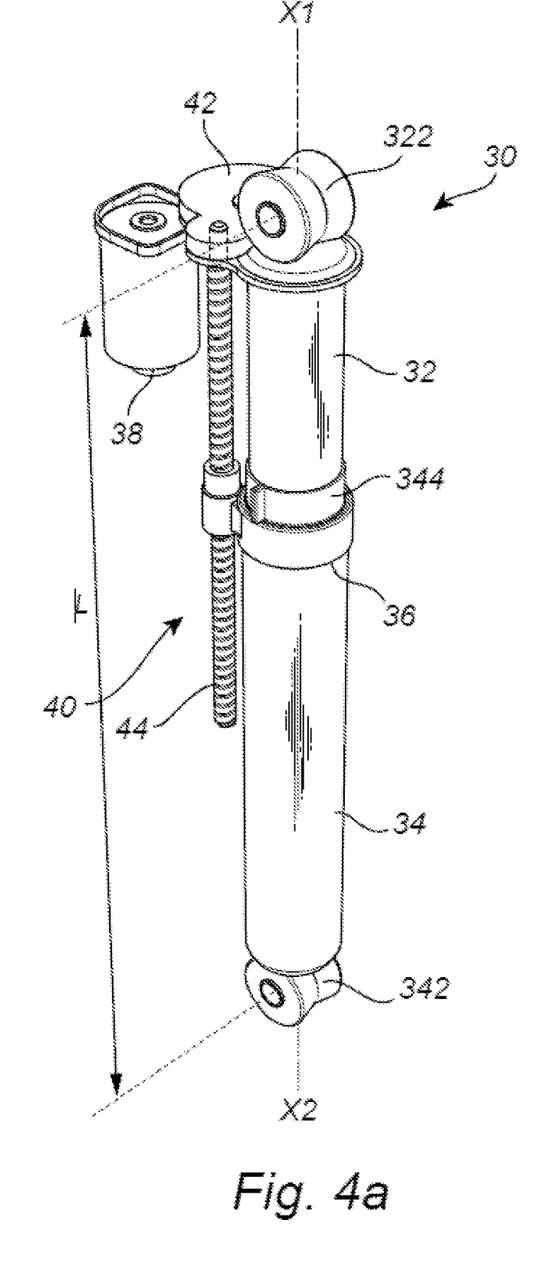
FIGS. 4a and 4b are perspective views of respective lifting arrangements according to example embodiments of the present disclosure.
Figure 4B:
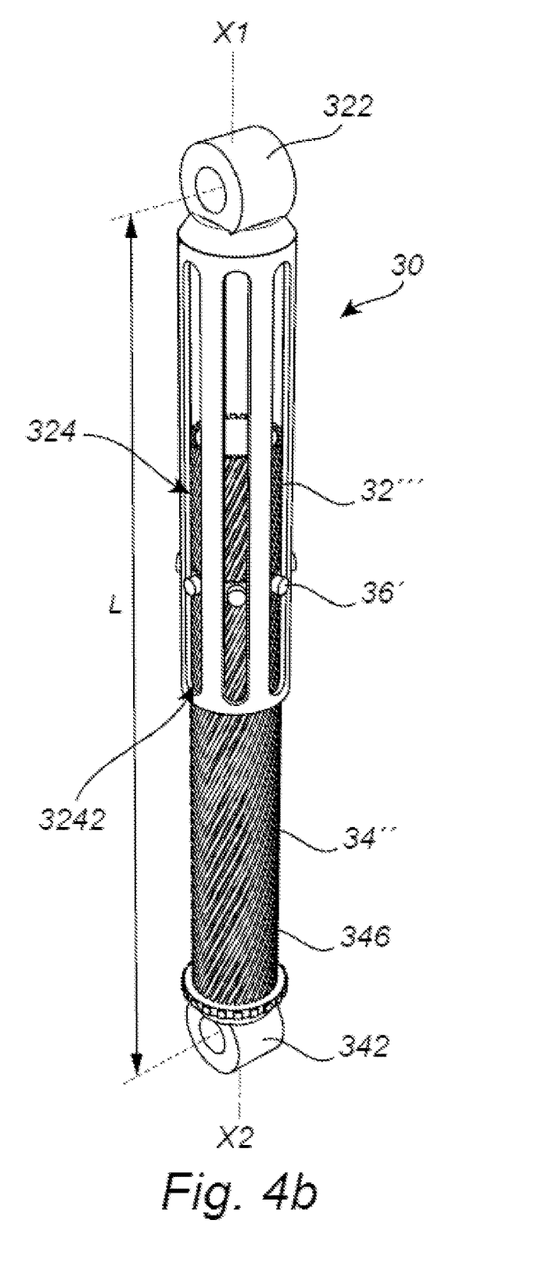

FIGS. 4*a* and 4*b* show respective example embodiments of lifting arrangements 30 according to the present disclosure.

The engaging device 36 of the embodiment shown in FIG. 4*a* is a nut member which encloses the second elongated member 34. More specifically, in the shown embodiment, the nut member 36 is arranged to be guided along the axis X2 by the outer peripheral surface of the second elongated member 34, which in the shown embodiment is a cylindrically shaped outer surface. Accordingly, the engaging device 36 may be arranged to slide on the second elongated member 34 along the axis X2.

In the alternative embodiment shown in FIG. 4b, the engaging device 36' is at least one pin member which is provided in a track 324 of the first elongated member 32'''. The track 324 extends along the axis X1, i.e. in this example the axis X1 is aligned with the axis X2. As shown, there may be several pin members 36' and several tracks 324 distributed around the axes X1, X2. As further shown in FIG. 4b, the second elongated member 34" may be arranged inside the first elongated member 32''' in a telescopic configuration. As shown, the second elongated member 34" may be provided with threads 346 on its outer peripheral surface which are arranged to cooperate with the at least one pin member 36' so that the at least one pin member 36' is axially moved in the track 324 and/or axially moved relative the second elongated member 34" when the first elongated member 32''' is rotated about the axis X1 and/or X2 relative the second elongated member 34". When the first and second elongated members 32''', 34" have been rotated relative each other so that the at least one pin member 36' contacts a lower end 3242 (i.e. a stop surface as disclosed herein) of the track 324, a continued relative rotation of the first and second elongated members 32'', 34" will result in a reduction of the length L. The contact between the at least one pin member 36' and the lower end 3242 of the track 324 relates to the engaged state as disclosed herein. Accordingly, when there is no contact therebetween, the engaging device 36' is in a disengaged state. The relative rotation of the first and second elongated members 32''', 34" may be effectuated by a motor (not shown). In a similar manner, when the first and second elongated members 32' ", 34" are relatively rotated in an opposite direction, the length L may be increased again.

The lifting arrangement 30 may further comprise a locking mechanism (not shown) for axially locking the first and second elongated members relative each other when the lifting arrangement has lifted the wheel axle 50 to a lifted position during use. Thereby, the lifting arrangement 30 will maintain the wheel axle 50 in a lifted position.

The lifting arrangement 30, such as the motor 38, may be controlled by a control unit (not shown) which issues control signals to the lifting arrangement 30, e.g. to the motor 38. The control signals may comprise a signal for lifting the wheel axle 50 during use and/or a signal for lowering the wheel axle 50 during use.

The lifting arrangement 30 may further comprise a cover (not shown), e.g. a dust cover, for protecting the different elements of the lifting arrangement 30.

Figure 5:
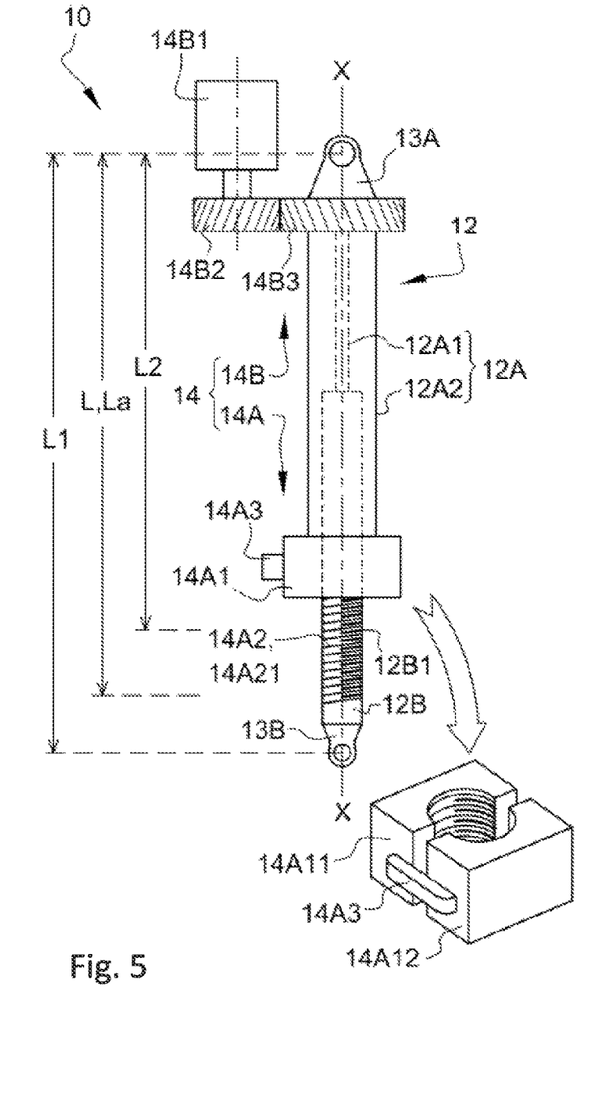
FIG. 5 shows a first embodiment of a shock absorber device.

FIG. 5 shows a shock absorber device 10 comprising a shock absorber 12 extending along an axis X and a lifting device 14. The axis X may correspond to the axis X1 and X2 as mentioned in the above, i.e. the axis X may correspond to two aligned axes. The shock absorber 12 comprises a first part 12A and a second part 12B axially movable with regard to each other along the axis X. The shock absorber 12 may have a first length L1 along the axis X in a rest position. The lifting device 14 is mounted onto the shock absorber 12 and is configured to adjust a length L of the shock absorber 12 along the axis X between a second length L2 and the first length L1, the second length
L2 being less than the first length L1. In the present example, the length L, L1, L2 may be measured between reference points (e.g. geometric centre of mounting through holes) of the mounting portions 13A and 13B. In the present example, the first length L1 is the length of the shock absorber 12 when mounted onto the vehicle 100, the vehicle 100 being empty (i.e. unloaded). In the present example, the second length L2 is the minimal length of the shock absorber 12 when totally compressed (i.e. maximum stroke). The lifting device 14 has a released configuration in which the lifting device 14 allows the first part 12A and the second part 12B to axially move with regard to each other along the axis X and an engaged configuration wherein the lifting device 14 axially couples the first part 12A and the second part 12B together.

In the present example, the shock absorber 12 is a damper, the first part 12A comprising a piston rod 12A1 and a dust cover 12A2 (i.e. dust cover of the piston). The second part 12B comprises a stator 12B 1. The dust cover 12A2 is rotatable relative to the second part 12B, and in this example relative to the stator 12B1, around the axis X. The dust cover 12A2 is also rotatable relative to the piston rod 12A1 around the axis X.

In the present example, the lifting device 14 is configured to mechanically axially couple the first part 12A and the second part 12B. In the present example, the first part 12A and the second part 12B are free to rotate relative to each other around the axis X when coupled with the help of the lifting device 14.

In the present example, the lifting device 14 comprises an engaging system 14A configured to reversibly axially couple the first part 12A and the second part 12B. The lifting device 14, in this example the engaging system 14A, which also may be denoted an engaging device, also comprises a first element 14A1 provided on the first part 12A, in this example on the dust cover 12A2, and a second element 14A2 provided on the second part 12B, in this example on the stator 12B1. The first element 14A1 and the second element 14A2 are reversibly engageable with each other.

In this example, the first element 14A1 comprises two half nuts 14A11 and 14A12, which may form all or part of a driving device, and the second element 14A2 comprise a helical path 14A21 which may form all or part of a driven device, the half nuts 14A11, 14A12 and the helical path 14A21 being configured to cooperate by form-fitting. The first element 14A1, in this example the half-nuts 14A11, 14A12 may be coupled in rotation around the axis X with the first part 12A, in this example with the dust cover 12A2. In the present example, the helical path 14A21 is arranged on an outer face of the stator 12B1. In a variant not shown, the helical path may be formed on an inner face of the dust cover 12A2 while complementary "half nuts" (with a thread on the outer face) may coupled in rotation with the stator 12B1. In such a case, the driving element would be the helical path and the driven element would be the "half nuts".

In another variant not shown, the helical path 14A21 may be protected by a rubber boot/rubber bellows to prevent penetration of dirt and water.

In the present example, the engaging system 14A is configured to reversibly engage the half nuts 14A11, 14A12 and the helical path 14A21. The engaging system 14A may comprise an electrical control device 14A3 including a solenoid, an electromagnet, or the like (not shown) to clamp/release the two half nuts 14A11, 14A12 with the helical path 14A21.

When the half nuts 14A11, 14A12 are clamped, the half nuts 14A11, 14A12 are engaged with the helical path 14A21 by form fitting. The first part 12A and the second part 12B are then axially coupled with each other along the axis X. The lifting device 14 may be considered to be in the engaged configuration, and axially couples the first part 12A and the second part 12B together along the axis X.

When the half nuts 14A11, 14A12 are released, the half nuts 14A11, 14A12 are disengaged from the helical path 14A21 by form fitting. The first part 12A and the second part 12B are free to axially move with regard to each other along the axis X. The lifting device 14 may be considered to be in a released configuration, and allows the first part 12A and the second part 12B to axially move with regard to each other along the axis X.

In the present example, the lifting device 14 comprise a motor 14B1, for example an electric motor, an air driven motor or a hydraulically driven motor, configured to drive the half nuts 14A11, 14A12. The motor 14B1 may be part of a driving system 14B including, in addition to the motor 14B1, several gears 14B2, 14B3, in this example two gears. The motor 14B1 may be mounted on a part of the vehicle 100, for example a part on which the mounting part 13A is mounted. The gear 14B2 is driven by the motor 14B1 and is meshed with the gear 14B3, which is coupled in rotation with the first part 12A, in this example the dust cover 12A2. The rotation of the dust cover 12A2 via the motor 14B1 thus drives the half nuts 14A11, 14A12, which are coupled in rotation with the dust cover 12A2. The half nuts 14A11, 14A12 then drive the second part 12B via the helical path 14A21 and the axial length L of the shock absorber may be thus adjusted.

In the engaged configuration, i.e. when the half nuts 14A11, 14A12 are engaged with the helical path 14A21, and when the motor 14B1 is operated in a first rotating direction, the length L of the shock absorber 12 along the axis X may be adjusted from its rest position, for example between the second length L2 and the first length L1 in order to lift the axle 50 of the vehicle 100, as shown in FIG. 1. When an appropriate length La has been set, the lifting device 14 may rest in the engaged configuration in order to block the shock absorber 12 (i.e. to maintain the axial coupling between the first part 12A and the second part 12B), and thus block the axle 50 in the lifted position. When the motor 14B1 is operated in a second rotating direction, opposed to the first rotating direction, the length L may be adjusted in order to move back to the rest position of the shock absorber 12. The axle 50 may be thus lowered and the wheels 52 may contact again the road. The half nuts 14A11, 14A12 may be then disengaged from the helical path 14A21 and the lifting device 14 set in the released configuration. The first part 12A and the second part 12B are thus axially free relative to each other and the shock absorber 12 may be used as usual, for its damping function.

Figure 6:
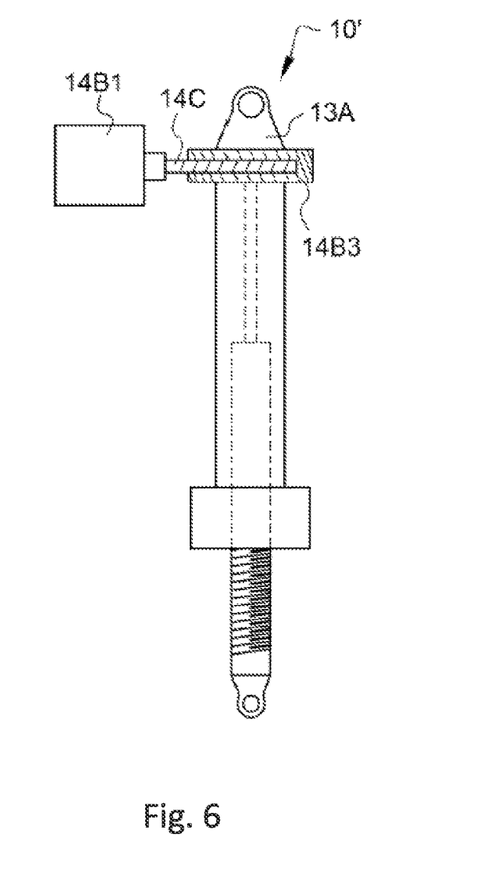
FIG. 6 shows a variant of the first embodiment.
Figure 7A:
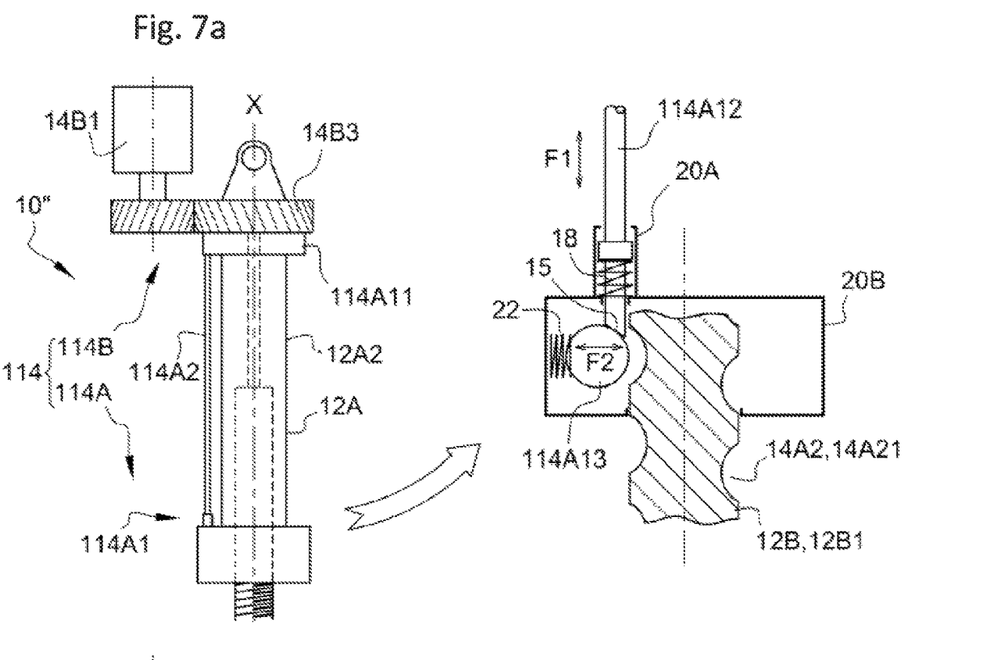
FIGS. 7a and 7b show a second embodiment of a shock absorber device.
Figure 7B:
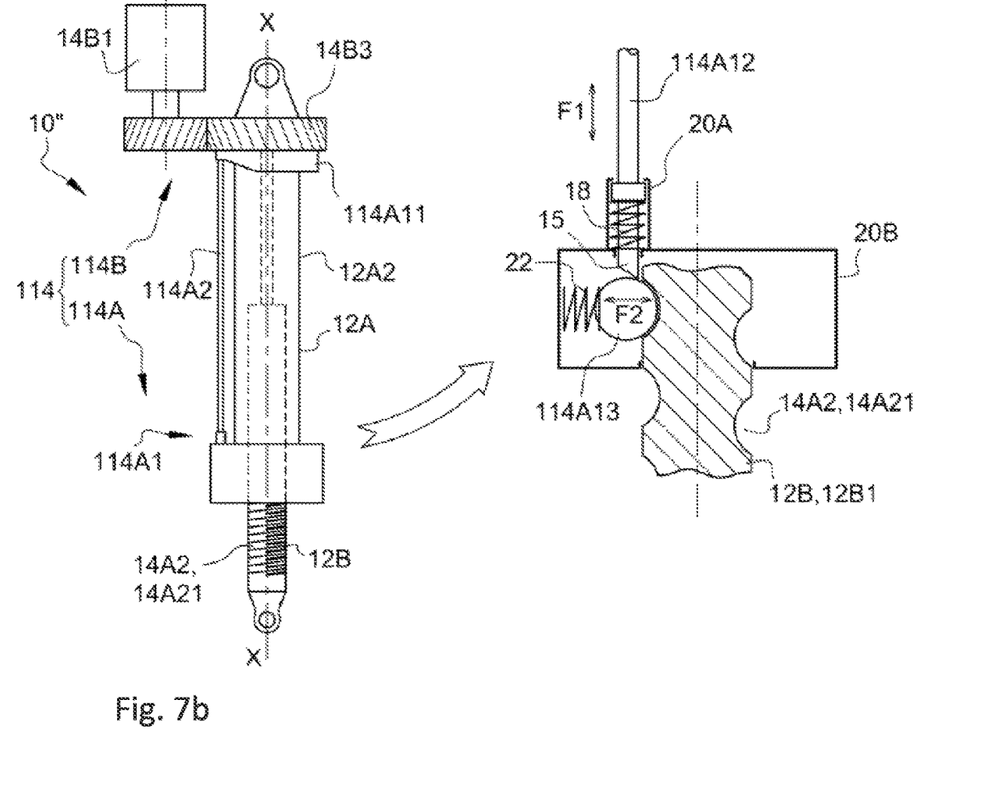

In a variant 10' shown in FIG. 6, the gear 14B2 may be replaced by a worm gear 14C and the arrangement of the motor 14B1 adapted accordingly. The rest of the shock absorber device 10' is identical to the shock absorber device 10 and not described again. It may be referred to the description of this embodiment in this respect. Another embodiment 10" of the shock absorber device is shown in FIGS. 7a and 7b. The shock absorber device 10" of this embodiment is similar to the shock absorber device 10 described in the above, only the engaging systems differ. The parts which are similar are not described again and it may be referred to the description of the embodiment of FIG. 5 in this respect.

The lifting device 114 comprises an engaging system 114A and a driving system 14B, similar to the one of the FIG. 5 embodiment. The engaging system 114A comprises a first element 114A1 provided on the first part 12A, in this example the dust cover 12A2, and a second element 14A2, similar to the second element of the FIG. 5 embodiment. The first element 114A1 and the second element 14A2 are reversibly engageable with each other. In this example, the first element 114A1 comprises a cam 114A11, a rod 114A12, and an engaging element 114A13, in the present example a ball. This may form a mechanical control device of the engaging system 114A.

The cam 114A11 is rotatable around the axis X, and is coupled in rotation with the gear 14B3. The cam 114A11 is configured, when rotated, to axially move the rod 114A12 along the axis X between a first position (see FIG. 7a) and a second position (see FIG. 7b).

Due to an appropriate clutch (not shown), known as such by the skilled person, the gear 14B3 is configured to sequentially rotate the cam 114A11 and the dust cover 12A2. Therefore, due to such a clutch, when the cam 114A11 is rotated (by the gear 14B3), the dust cover 12A2 is not rotated (by the gear 14B3), and when the dust cover 12A is rotated (by the gear 14B3), the cam 114A11 is not rotated (by the gear 14B3). In this example, the rod 114A12, the ball 114A13 and the casings 20A, 20B may be coupled in rotation with the dust cover 12A2 and are rotated together with the dust cover 12A2 when the dust cover 12A2 is rotated around the axis X.

The rod 114A12 extends along the axis X between the cam 114A11 and the ball 114A13. The rod 114A12 may permanently contact both the ball 114A13 and the cam 114A11, but not necessarily. A distal end 15 of the rod 114A12 may cooperate with the ball 114A13 in order to radially move the ball 114A13 (i.e. move the ball 114A13 along an axis perpendicular to the axis X). When the cam 114A11 is rotated around the axis X, the rod 114A12 is moved along the axis X as shown by the double arrow F1, in one direction or in the other direction opposite to the one direction. A return spring 18, disposed in a casing 20A through which the rod 114A12 extends, is configured to push the rod 114A12 axially toward the cam 114A11 so that the rod 114A12 permanently bears against the cam 114A11.

The ball 114A13 is housed in a casing 20B, adjacent to the casing 20A, and in which the distal end 15 of the rod 114A12 extends. A return spring 22, disposed in the casing 20B pushes radially the ball 114A13 towards the first part 12B, in order the engage the ball 114A13 with the helical path 14A21. Due to the axial movement of the rod 114A12 according to the arrow F1 the ball 114A13 may be moved radially as shown by the double arrow F2, in one direction or in the other direction opposite to the one direction. In other words, the rod 114A12 is configured to push the ball 114A13 radially away from the first part 12B, in order to disengage to ball 114A13 from the helical path 14A21 (see FIG. 7a), or to free (or partially free) the ball 114A13 to be pushed by the return spring 22 toward the first part 12B, and to engage the ball 114A13 with the helical path 14A21 (see FIG. 7b).

In the present example, the ball 114A13 may form all or part of a driving device while the helical path 14A21 may form all or part of a driven device. In the configuration shown in FIG. 7a, the ball 114A13 is disengaged form the helical path 14A21 and the lifting device 114 may be considered to be in the released configuration. When the motor 14B1 is operated in a first rotating direction, the gear 14B3 is driven. Due to the clutch between the gear 14B3 on one side and the cam 114A11 and the dust cover 12A2 on the other side, the cam 114A11 is rotated first together with the gear 14B3 while the dust cover 12A2 is not rotated. The rotation of the cam 114A11 allows the rod 114A12, by following the cam path, to move axially (upwardly in FIGS. 7a and 7b) due to the return spring 18. This movement frees the ball 114A13 which is thus moved radially by the return spring 22 and engaged with the helical path 14A21, as shown in FIG. 7b. Then, still due to the clutch between the gear 14B3 on one side and the cam 114A11 and the dust cover 12A2 on the other side, the motor 14B1 being still operated, the dust cover 12A2 starts to rotate together with the gear 14B3 while the cam 114A11 is not rotated anymore. Due to the engagement of the ball 114A13 with the helical path 14A21, the ball 114A13 being coupled in rotation with the dust cover 12A2, the length L of the shock absorber 12 along the axis X may be adjusted from its rest position, for example between the second length L2 and the first length L1 in order to lift the axle 50 of the vehicle 100, as shown in FIG. 1. When an appropriate length La has been set, the lifting device 14 remains in the engaged configuration and blocks the shock absorber 12 (i.e. to maintain the axial coupling between the first part 12A and the second part 12B), and thus block the axle 50 in the lifted position. When the motor 14B1 is operated in a second rotating direction, opposed to the first rotating direction, only the dust cover 12A2 is rotated (and not the cam 114A11) and the length L may be adjusted in order to move back to the rest position of the shock absorber 12. The axle 50 may be thus lowered and the wheels 52 may contact again the road. Then due to the clutch, the cam 114A11 starts to rotate together with the gear 14B3 while the dust cover 12A2 is not rotated anymore. The rod 114A12 is then pushed downward (in FIGS. 4A and 4B) and pushes the ball 114A13 radially outward which is then disengaged from the helical path 14A21. The first part 12A and the second part 12B are thus axially free relative to each other and the shock absorber 12 may be used as usual, for its damping function.

In a variant not shown, the ball 114A13 and related parts may be replaced by the two half nuts 14A11, 14A12 of the FIG. 5 embodiment, the rod 114A11 being configured to clamp/release the two half nuts 14A11, 14A12 with the helical path 14A21.

Figure 8:
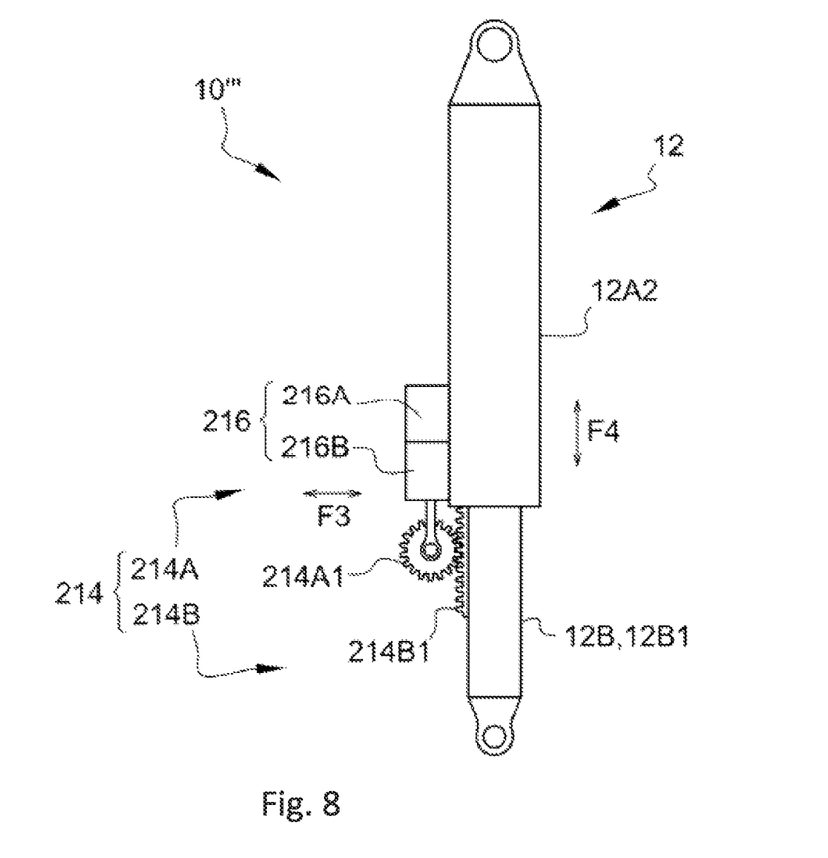
FIG. 8 shows a third embodiment of a shock absorber device.

A further embodiment 10' of the shock absorber device is shown in FIG. 8. The shock absorber device 10''' of this embodiment is similar to the shock absorber device of the FIG. 5 embodiment 10, and only the lifting device differs. The parts which are similar are not described again and it may be referred to the description of the FIG. 5 embodiment in this respect.

The lifting device 214 comprises a first element 214A, which may comprise in this example a pinion 214A1, and a second element 214B, which may comprise in this example a rack 214B1, and which are reversibly engageable with each other. The first element 214A is provided on the first part 12A, in this example on the dust cover 12A2. In the present example, the second element 214B is provided on the second part 12B, in this example on an outer face of the stator 12B1. The pinion 214A1 may form a driving device while the rack 214B 1 may form a driven device. In the present example, the dust cover 12A2 and the stator 12B1 may be not rotatable relative to each other around the axis X, at least when coupled with the help of the lifting device 214.

A control system 216 of the lifting device 214 comprises an engaging system 216A and a driving system 216B. The control system 216 may be directly mounted onto the dust cover 12A2.

The engaging system 216A is configured to reversibly engage the pinion 214A1 and the rack 214B1, for example by moving the pinion 214A1 along the double arrow F3 in FIG. 8 in order to engage/disengage the pinion 214A1 with/from the rack 214B1. Such an engaging system is known as such by the skilled person and is not described in detail. It may comprise an electrical or a mechanical control device. When the pinion 214A1 is engaged with the rack 214B 1, the lifting device 214 may be considered to be in an engaged configuration. When the pinion 214A1 is disengaged from the rack 214B1, the lifting device 214 may be considered to be in a released configuration.

The driving system 216B comprises a motor (not shown), for example an electric motor, an air driven motor or a hydraulically driven motor, configured to drive the pinion 214A1. The motor may drive the pinion 214A1 directly or via a gearbox (not shown). Depending on the rotation of the pinion 214A1, the stator 12B 1 may be moved along the axis X, in one direction or in the opposite direction of the one direction (see double arrow F4).

In the engaged configuration, i.e. when the pinion 214A1 is engaged with the rack 214B1, and when the driving system 216B is operated in a first rotating direction, the length L of the shock absorber 12 along the axis X may be adjusted from the rest position of the shock absorber 12, for example between the second length L2 and the first length L1 in order to lift the axle 50 of the vehicle 100, as shown in FIG. 1. When an appropriate length La has been set, the lifting device 214 may rest in the engaged configuration in order to block the shock absorber 12 (i.e. to maintain the axial coupling between the first part 12A and the second part 12B), and thus block the axle 50 in the lifted position. When the driving system 216B is operated in a second rotating direction, opposed to the first rotating direction, the length L may be adjusted in order to come back to the rest position of the shock absorber 12. The axle 50 may be thus lowered and the wheels 52 may contact again the road S. The pinion 214A1 may be then disengaged from the rack 214B1 and the lifting device 14 set in the released configuration. The first part 12A and the second part 12B are thus axially free relative to each other and the shock absorber 12 may be used as usual, for its damping function.

It is to be understood that the present disclosure is not limited to the embodiments described above and illustrated in the drawings; rather, the skilled person will recognize that many changes and modifications may be made within the scope of the appended claims.

For example, the vehicle 100 may be provided with any of the shock absorber devices and/or lifting arrangements disclosed in the present disclosure, for example with the shock absorber device 10, 10', 10'', 10''', the lifting arrangement 30, and any variants thereof.

In the below, possible features and feature combinations of embodiments of the second aspect of the present disclosure are presented as a list of items:

1. A shock absorber device (10, 10', 10'', 10''') for a vehicle (100), the shock absorber device (10, 10', 10'', 10''') comprising a shock absorber (12) extending along an axis (X) and a lifting device (14, 114, 214), the shock absorber (12) comprising a first part (12A) and a second part (12B) axially movable with regard to each other along the axis (X) and having a first length (L1) along the axis (X) in a rest position, the lifting device (14, 114, 214) being mounted onto the shock absorber (12) and being configured to adjust a length of the shock absorber (12) along the axis (X) between a second length (L2) and the first length (L1), the second length (L2) being less than the first length (L1), wherein the lifting device (14, 114, 214) has a released configuration in which the lifting device (14, 114, 214) allows the first part (12A) and the second part (12B) to axially move with regard to each other along the axis (X)

and an engaged configuration in which the lifting device (14, 114, 214) axially couples the first part (12A) and the second part (12B) together.

2. The shock absorber device (10, 10', 10", 10''') according to item 1, wherein, in the engaged configuration, the lifting device (14, 114, 214) mechanically axially couples the first part (12A) and the second part (12B) together.

3. The shock absorber device (10, 10', 10", 10''') according to item 1 or 2, wherein the lifting device (14, 114, 214) comprises an engaging system (14A, 114A, 216A) configured to reversibly axially couple the first part (12A) and the second part (12B).

4. The shock absorber device (10, 10', 10", 10''') according to any one of items 1 to 3, wherein the lifting device (14, 114, 214) comprises a first element (14A1, 114A1, 214A) and a second element (14A2, 214B), the first part (12A) of the shock absorber (12) being provided with the first element (14A1, 114A1, 214A) and the second part (12B) of the shock absorber (12) being provided with the second element (14A2, 214B), the first element (14A1, 114A1, 214A) and the second element (14A2, 214B) being reversibly engageable with each other.

5. The shock absorber device (10, 10', 10", 10''') according to item 4, wherein one element among the first element (14A1, 114A1, 214A) and the second element (14A2, 214B) comprises a driving device (14A11, 14A12; 114A13; 214A1) and the other element among the first element (14A1, 114A1, 214A) and the second element (14A2, 214B) comprises a driven device (14A21; 214B1), the driving device (14A11, 14A12; 114A13; 214A1) and the driven device (14A21; 214B1) being configured to cooperate by form-fitting.

6. The shock absorber device (10, 10', 10", 10''') according to item 5, wherein the lifting device (14, 114, 214) comprises a motor (14B1), for example an electric motor, an air driven motor or a hydraulically driven motor, configured to drive the driving device (14A11, 14A12; 114A13; 214A).

7. The shock absorber device (10, 10', 10", 10''') according to item 5 or 6, wherein the driven device comprises a rack (214B) or a helical path (14A21).

8. The shock absorber device (10, 10', 10", 10''') according to item 3 and any one of items 5 to 7, wherein the engaging system (14A, 114A, 216A) is configured to reversibly engage the driving device (14A11, 14A12; 114A13; 214A) and the driven device (14A21; 214B).

9. The shock absorber device (10, 10', 10", 10''') according to any one of items 1 to 8, wherein the first part (12A) comprises a piston rod (12A1).

10. The shock absorber device (10, 10', 10", 10''') according to item 9 and any one of items 4 to 7, wherein the first element (14A1, 114A1, 214A) is at least in part mounted onto a dust cover (12A2) of the piston rod (12A1).

11. The shock absorber device (10, 10', 10") according to item 10, wherein the dust cover (12A2) is rotatable relative to the second part (12B) around the axis (X).

12. The shock absorber device (10, 10', 10") according to items 6 and 11, wherein the driving device (14A11, 14A12; 114A13) is mounted onto the dust cover (12A2) and the motor (14B1) is configured to rotate the dust cover (12A2) around the axis (X).

13. The shock absorber device (10, 10', 10", 10''') according to any one of items 1 to 12, wherein the second part (12B) comprises a stator (12B1).

14. The shock absorber device (10, 10', 10", 10''') according to items 7 and 13, wherein the rack (214B) or the helical path (14A21) is arranged on an outer face of the stator (12B1).

15. A vehicle (100) comprising the shock absorber device (10, 10', 10", 10''') according to any one of items 1 to 14.

In the below, possible features and feature combinations of embodiments of the first aspect of the present disclosure are presented as a list of items:

A1. A lifting arrangement (30, 10, 10', 10", 10' ''') for lifting a wheel axle (50) of a vehicle (100), the lifting arrangement comprising:
  a first elongated member (32, 32', 32", 12A) extending along a first axis (X1, X), the first elongated member (32, 32', 32", 12A) comprising a vehicle frame coupling portion (322, 13A) for connecting the lifting arrangement (30, 10, 10', 10", 10''') to a vehicle frame of the vehicle (100) during use,
  a second elongated member (34, 34', 34", 12B) extending along a second axis (X2, X), the second elongated member (34, 34', 34", 12B) comprising a wheel axle coupling portion (342, 13B) for connecting the lifting arrangement (30) to the wheel axle (50) of the vehicle (100) during use,
  wherein the vehicle frame coupling portion (322, 13A) and the wheel axle coupling portion (342, 13B) are offset from each other by a length (L) and wherein the lifting arrangement (30) is arranged to adjust the length (L) between a maximum length (Lmax) and a minimum length (Lmin) by axially moving the second elongated member (34, 34', 34", 12B) along the second axis (X2, X) relative the first elongated member (32, 32', 32", 12A),
  wherein the lifting arrangement (30, 10, 10', 10", 10''') further comprises an engaging device (36, 36', 14A1) for axially moving the second elongated member (34, 34', 34", 12B) along the second axis (X2, X) relative the first elongated member (32, 32', 32"), and wherein the engaging device (36, 36', 14A1, 114A1, 214A1) is arranged to be provided in an engaged state with the first elongated member (32") or the second elongated member (34, 34', 34", 12B) so that the length (L) can be reduced and in a disengaged state with respect to the first elongated member (32") or the second elongated member (34, 34', 34", 12B) so that forces exerted on the wheel axle coupling portion (342, 13B) from the wheel axle (50) during use are prevented from being transferred to the engaging device (36, 36', 14A1, 114A1, 214A1).

A2. The lifting arrangement (30, 10, 10', 10", 10''') according to item A1, wherein the first and second elongated members (32, 32', 32", 34, 34', 34") are arranged so that the first axis (X1, X) and the second axis (X2, X) are aligned during movement between the maximum length (Lmax) and the minimum length (Lmin) or so that the first axis (X1) and the second axis (X2) are parallel during movement between the maximum length (Lmax) and the minimum length (Lmin).

A3. The lifting arrangement (30, 10, 10', 10", 10' '') according to any one of the preceding items, wherein the first and second elongated members (32, 34) are telescopically arranged relative each other.

A4. The lifting arrangement (30, 10, 10', 10", 10' '') according to any one of the preceding items, wherein the first and second elongated members (32, 34, 12A, 12B) form a shock absorber device for the vehicle (100).

A5. The lifting arrangement (30) according to any one of the preceding items, wherein the engaging device (36, 36',

14A1, 114A1, 214A1) is axially movable along the second axis (X2) relative the second elongated member (34, 34', 34").

A6. The lifting arrangement (30) according to item A5, wherein the first or second elongated member (34, 34', 34") comprises a stop surface (344) for the engaging device (36, 36'), and wherein, in the engaged state, the engaging device (36, 36') is arranged to engage with the stop surface (344) and thereafter axially move the second elongated member (34, 34', 34") along the second axis (X2) relative the first elongated member (32, 32', 32") so that the length (L) is reduced.

A7. The lifting arrangement (30) according to item A6, wherein, in the engaged state and at least until the minimum length (Lmin) is reached, the first (32''') or the second elongated member (34, 34', 34") is releasable from the engaging device (36, 36') so that the length (L) can be reduced.

A8. The lifting arrangement (30) according to any one of items A5-A7, wherein the engaging device (36) is a nut member enclosing the second elongated member (34), or wherein the engaging device (36') is at least one pin member movable in a track (324) of the first elongated member (32' ").

A9. The lifting arrangement (30, 10, 10', 10", 10' ") according to any one of the preceding items, further comprising a motor (38, 14B1), such as an electric motor, and wherein the engaging device (36, 36') is driven by the motor for axially moving the second elongated member (36, 36') along the second axis (X2) relative the first elongated member (32, 32', 32").

A10. The lifting arrangement (30, 10, 10', 10", 10''') according to item A9, further comprising one or more mechanical driving elements (40), such as a gearbox (42, 14B2, 14B3, 14C) and a screwing rod (44), for transferring a driving force from the motor (38, 14B1) to the engaging device (36, 36', 14A1, 114A1, 214A1).

A11. The lifting arrangement (30, 10, 10', 10", 10''') according to any one of the preceding items, wherein in the engaged state, the engaging device (36, 36', 14A1, 114A1, 214A1) mechanically axially couples the first elongated member (32, 32', 32", 12A) and the second elongated member (34, 34', 34", 12B) together.

A12. The lifting arrangement (10, 10', 10", 10''') according to any one of the preceding items, wherein the engaging device comprises a first element (14A1, 114A1, 214A) and a second element (14A2, 214B), the first elongated member (12A) comprising the first element (14A1, 114A1, 214A) and the second elongated member (12B) comprising the second element (14A2, 214B), the first element (14A1, 114A1, 214A) and the second element (14A2, 214B) being reversibly engageable with each other.

A13. The lifting arrangement (10, 10', 10", 10''') according to item A12, wherein one element among the first element (14A1, 114A1, 214A) and the second element (14A2, 214B) of the engaging device comprises a driving device (14A11, 14A12; 114A13; 214A1) and the other element among the first element (14A1, 114A1, 214A) and the second element (14A2, 214B) of the engaging device ( ) comprises a driven device (14A21; 214B1), the driving device (14A11, 14A12; 114A13; 214A1) and the driven device (14A21; 214B 1) being configured to cooperate by form-fitting.

A14. The lifting arrangement (10, 10', 10", 10''') according to item A13, wherein the driven device comprises a rack (214B) or a helical path (14A21).

A15. The lifting arrangement (10, 10', 10", 10''') according to item A13 or A14, wherein the engaging device ( ) is configured to reversibly engage the driving device (14A11, 14A12; 114A13; 214A) and the driven device (14A21; 214B).

A16. The lifting arrangement (30, 10, 10', 10", 10''') according to any one of the preceding items, wherein the first elongated member (32, 12A) comprises a piston rod (12A1).

A17. The lifting arrangement (10, 10', 10", 10''') according to item A16 and anyone of items A12-A15, wherein the first element (14A1, 114A1, 214A) is at least in part mounted onto a dust cover (12A2) of the piston rod (12A1).

A18. The lifting arrangement (10, 10', 10", 10''') according to item A17, wherein the dust cover (12A2) is rotatable relative to the second part (12B) around the second axis (X2).

A19. The lifting arrangement (10, 10', 10", 10' ") according to item A9 and A18, wherein the driving device (14A11, 14A12; 114A13) is mounted onto the dust cover (12A2) and the motor (14B 1) is configured to rotate the dust cover (12A2) around the second axis (X2).

A20. A vehicle (100) comprising a lifting arrangement (30) according to any one of the preceding items.

The invention claimed is:

1. A lifting arrangement for lifting a wheel axle of a vehicle, the lifting arrangement comprising:
    a first elongated member extending along a first axis, the first elongated member comprising a vehicle frame coupling portion for connecting the lifting arrangement to a vehicle frame of the vehicle during use, and
    a second elongated member extending along a second axis, the second elongated member comprising a wheel axle coupling portion for connecting the lifting arrangement to the wheel axle of the vehicle during use,
    wherein the vehicle frame coupling portion and the wheel axle coupling portion are offset from each other by a length and wherein the lifting arrangement is arranged to adjust the length between a maximum length and a minimum length by axially moving the second elongated member along the second axis relative to the first elongated member,
    wherein the lifting arrangement further comprises an engaging device for axially moving the second elongated member along the second axis relative to the first elongated member,
    wherein the engaging device is arranged to be provided in an engaged state with the first elongated member or the second elongated member so that the length can be reduced and in a disengaged state with respect to the first elongated member or the second elongated member so that forces exerted on the wheel axle coupling portion from the wheel axle during use are prevented from being transferred to the engaging device; and
    wherein the engaging device is axially movable along the second axis relative to the second elongated member.

2. The lifting arrangement of claim 1, wherein the first and the second elongated members are arranged so that the first axis and the second axis are aligned during movement between the maximum length and the minimum length or so that the first axis and the second axis are parallel during movement between the maximum length and the minimum length.

3. The lifting arrangement of claim 1, wherein the first and the second elongated members are telescopically arranged relative to each other.

4. The lifting arrangement of claim 1, wherein the first and the second elongated members form a shock absorber device for the vehicle.

5. The lifting arrangement of claim 1, wherein the first or the second elongated member comprises a stop surface for the engaging device, and wherein, in the engaged state, the engaging device is arranged to engage with the stop surface and thereafter axially move the second elongated member along the second axis relative to the first elongated member so that the length is reduced.

6. The lifting arrangement of claim 5, wherein, in the engaged state and at least until the minimum length is reached, the first or the second elongated member is releasable from the engaging device so that the length can be reduced.

7. The lifting arrangement of claim 1, wherein the engaging device is a nut member enclosing the second elongated member, or wherein the engaging device is at least one pin member movable in a track of the first elongated member.

8. The lifting arrangement of claim 1, further comprising a motor, and wherein the engaging device is driven by the motor for axially moving the second elongated member along the second axis relative to the first elongated member.

9. The lifting arrangement of claim 8, further comprising one or more mechanical driving elements for transferring a driving force from the motor to the engaging device.

10. The lifting arrangement of claim 1, wherein in the engaged state, the engaging device mechanically axially couples the first elongated member and the second elongated member together.

11. The lifting arrangement of claim 1, wherein the engaging device comprises a first element and a second element, the first elongated member comprising the first element and the second elongated member comprising the second element, the first element and the second element being reversibly engageable with each other.

12. The lifting arrangement of claim 11, wherein one element among the first element and the second element of the engaging device comprises a driving device and the other element among the first element and the second element of the engaging device comprises a driven device, the driving device and the driven device being configured to cooperate by form-fitting.

13. The lifting arrangement of claim 12, wherein the driven device comprises a rack or a helical path.

14. A vehicle comprising the lifting arrangement of claim 1.

15. The lifting arrangement of claim 8, wherein the motor comprises an electric motor.

16. The lifting arrangement of claim 9, wherein the one or more mechanical driving elements comprises a gearbox and a screwing rod.

17. A lifting arrangement for lifting a wheel axle of a vehicle, the lifting arrangement comprising:
a first elongated member extending along a first axis, the first elongated member comprising a vehicle frame coupling portion for connecting the lifting arrangement to a vehicle frame of the vehicle during use, and
a second elongated member extending along a second axis, the second elongated member comprising a wheel axle coupling portion for connecting the lifting arrangement to the wheel axle of the vehicle during use,
wherein the vehicle frame coupling portion and the wheel axle coupling portion are offset from each other by a length and wherein the lifting arrangement is arranged to adjust the length between a maximum length and a minimum length by axially moving the second elongated member along the second axis relative to the first elongated member,
wherein the lifting arrangement further comprises an engaging device for axially moving the second elongated member along the second axis relative to the first elongated member,
wherein the engaging device is arranged to be provided in an engaged state with the first elongated member or the second elongated member so that the length can be reduced and in a disengaged state with respect to the first elongated member or the second elongated member so that forces exerted on the wheel axle coupling portion from the wheel axle during use are prevented from being transferred to the engaging device; and
further comprising a motor, wherein the engaging device is driven by the motor for axially moving the second elongated member along the second axis relative to the first elongated member.

18. The lifting arrangement of claim 17, further comprising one or more mechanical driving elements for transferring a driving force from the motor to the engaging device.

19. The lifting arrangement of claim 18, wherein the one or more mechanical driving elements comprises a gearbox and a screwing rod.

* * * * *